United States Patent [19]

Greco, II et al.

[11] Patent Number: 4,685,068
[45] Date of Patent: Aug. 4, 1987

[54] GENERIC DATABASE GENERATOR SYSTEM AND METHOD

[76] Inventors: Joseph A. Greco, II, Silver Spring; Donald K. Hawkins, College Park; Scott R. LeGrys, Burtonsville; Wai Kit Man, Silver Spring, all of Md.

[73] Assignee: The Singer Company, Silver Spring, Md.

[21] Appl. No.: 767,733

[22] Filed: Aug. 20, 1985

[51] Int. Cl.[4] .................. G06F 15/66; H04N 1/46; G06K 9/46
[52] U.S. Cl. .................... 364/518; 358/75; 382/1; 382/17
[58] Field of Search ............... 364/518, 521, 522, 526; 358/75, 78, 903; 382/1, 17, 18; 340/715, 703

[56] References Cited

U.S. PATENT DOCUMENTS

| | | | |
|---|---|---|---|
| 3,930,237 | 12/1975 | Villers | 364/518 X |
| 4,205,389 | 5/1980 | Hearty | 364/521 X |
| 4,270,141 | 5/1981 | Sakamoto | 358/78 |
| 4,477,829 | 10/1984 | Ziran et al. | 382/17 X |
| 4,489,389 | 12/1984 | Berkwith et al. | 364/518 X |

FOREIGN PATENT DOCUMENTS 2019336A 10/1979 United Kingdom ............... 364/521

OTHER PUBLICATIONS

"Defense Mapping Agency (DMA) Policy for Digital Mapping, Charting, and Geodesy (MC&G) Support of Advanced Systems", B. D. Shelkin, 6th Interservice ITEC; Oct. 1984, pp. 99–102.
"A Fast Parallel Algorith for Thinning Digital Patterns" T. Y. Zharg and C. Y. Suen, Communications of the ACM, Mar. 1984, pp. 236–239.
"Mapping the Swannee River", D. O. Morgan and W. E. Smith, Computer Graphics World, Jul. 1984, pp. 20–26.
"Municipal Mapping in Saudi Arabia", F. L. Hannigan, Computer Graphics World, Jul. 1984, pp. 37–41.

Primary Examiner—W. B. Perkey

[57] ABSTRACT

System and method for processing information from a paper map source to produce an accurate high resolution digitized map database in matrix format having separate files for each selected feature. The system and method scans the input paper map source and processes the scanned data into a digitized map database in matrix format with distinct and selectable features as are represented on the input map. Selected features include vegetation, hydrography, lines of communication, miscellaneous features, and terrain elevation. The use of separate files significantly reduces the processing time required by application programs used to analyze or display the data relating to a particular feature.

30 Claims, 20 Drawing Figures

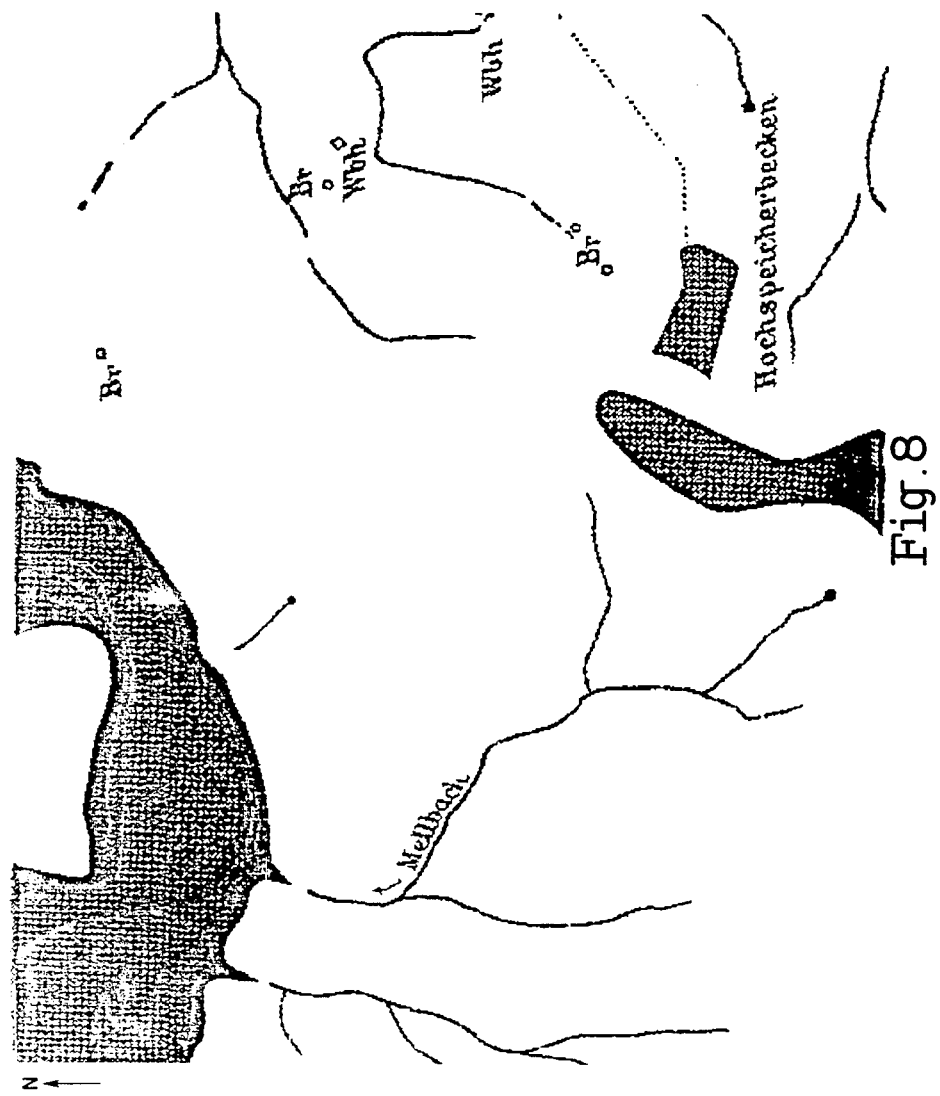

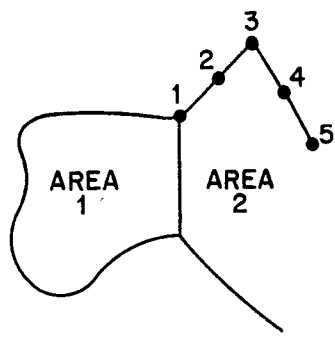
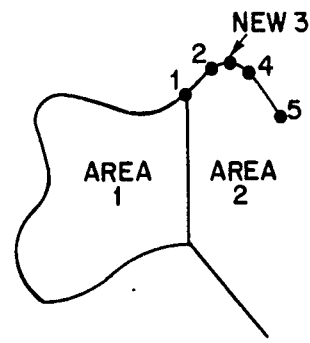
Fig.14A  Fig.14B
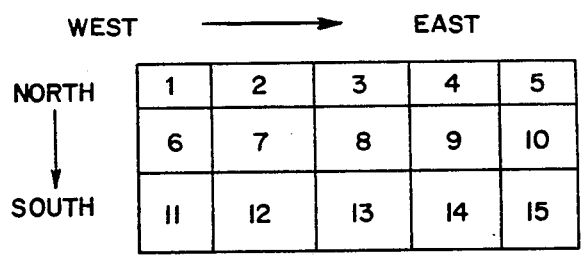
Fig.15

GENERIC DATABASE GENERATOR SYSTEM AND METHOD

BACKGROUND OF THE INVENTION

1. Field of the Invention

The present invention relates generally to the field of generating databases and more particularly relates to a system and method for generating a digitized matrix database in accordance with a paper map source.

2. Related Art

Database generator systems and methods are used in many applications. Generally, the database product of the database generator system is used by application computer programs in performing the tasks required of the application program. One application utilizing a digitized database is a visual display system providing information to a user where such information is based directly from the digitized database or is based on processing of the digitized database.

Databases having separate selectable features are prepared using data obtained from numerous sources. For example, digitized map databases are prepared from sources such as satellite information, paper maps, aerial photographs and the like. Such sources can be used in several combinations and with various methods to produce a digitized database meeting the specific requirements for that particular database. Each type of source provides certain qualities that can be used in generating a digitized map database. However, each type of source also has limitations which may not meet the requirements for some databases.

Although satellite scanning provides data immediately in digital format, this method does not provide all the features which can be extracted from a paper map. Also, the resolution of the data obtained from the satellite scanning is limited.

Various digitized information can be obtained from aerial photographs. For example, using stereoplotters elevation data can be extracted. However, using aerial photographs to extract other topographical features requires manual digitizing methods.

Manual digitizing methods exist using aerial photographs or paper maps as the source for the database. The database is created by first drawing grid lines on the map or aerial photograph at intervals representing the desired resolution. The next step is the manual coding of each grid intersection using a digitizing tablet. The third step is to process the resulting data to obtain the database format required.

The disadvantages to the manual digitizing method are several, including: (1) a significant number of errors can be expected due to the number of manhours required to perform the tedious task of manually digitizing the vast amount of data and then verifying the results; (2) a high cost can be expected due to the large number of manhours required to implement this method; and (3) the resolution of this method is low, typically 100 to 500 meters per data point due to the length of time required to perform the task. An increase in the resolution under the manual method is directly proportional to the increase in the number of manhours required to complete the task. It can be seen that eliminating one disadvantage under the manual digitizing method increases the detrimental effects of the other disadvantages.

The Defense Mapping Agency (DMA) provides mapping, charting and geodetic support and services to the United States Department of Defense through the production and worldwise distribution of maps, charts, precise positioning data and digital data for strategic and tactical military operations and weapons systems. DMA has several digital database products that are described in a paper entitled "Defense Mapping Agency (DMA) Policy for Digital Mapping, Charting and Geodesy (MC&G) Support of Advanced Systems" by Barry D. Shelkin, which was presented at the Sixth Interservice/Industry Training Equipment Conference in Washington, DC in October 1984, which paper is incorporated by reference herein. Although DMA provides digital terrain elevation data and terrain contour matching data in matrix format, and other digital data in vector format, the rapid expansion of requirements for digital MC&G products to support advanced weapon systems has required DMA to reevaluate its digital data policy. The new DMA policy as represented in Shelkin's paper provides for a standardization of the methodology used by DMA in producing its digital MC&G products.

The United States Army is now using a training device known as Army Training Battle Simulation System (ARTBASS). ARTBASS is designed to provide battalion commanders and their staffs with realistic training in developing, assessing and correlating tactical and logistic data which was previously only possible through the generation of large scale field exercises or in paper dominated command post exercises. A typical ARTBASS device contains two color monitors on which topographical features are displayed in place of paper maps. The digitized map database representing the topographical paper map used for ARTBASS was originally obtained from DMA. The digitized map database utilized by ARTBASS had a required resolution of a 25 meter square. To produce such a digitized database, DMA had to use special methods to produce a digitized map database at the required resolution and with all features stored in one file. Additional processing by the user was required to display individual map features such as vegetation. As indicated in Shelkin's paper, DMA now has standardized its methods for all users; and such methods do not provide directly a digitized map database having such resolution and feature characteristics as required in ARTBASS.

There are two formats for digitized databases relating to application programs using digital displays. One format is known as the vector format, where the informaion stored contains a starting point with a direction and a rate. Not all points on a display have vector information stored in the database. To obtain the current status of a point on a display, the application program must constantly follow all vectors in the database to determine which vectors cross such point.

The other format for digitized databases is the matrix format. In the matrix format each data point on the display has the information in the database associated with that point. Unlike the vector format, the current status of any point is known instantaneously when the database is in matrix format.

The advantage of using a database having a vector format is that it takes less time and space to generate the database. The disadvantage is that the application program uses more time to process the vector formatted database. In a real-time simulation system such as ARTBASS, processing time is critical to meet the real-time training requirements. A digitized database in matrix format requires less application processing time, therefore, the matrix formatted database is better suited to meet the timing requirements. While the database using matrix format requires more time to generate, the processing time for the application program is significantly less because the information is available in the database.

ARTBASS represents one application of digitized database requiring a database generator system and method that will produce a digitized database in matrix format with a high resolution. Other applications of such digitized databases are anticipated because of the ever increasing utilization of computers in all phases of decision making processes. Such applications include low altitude navigation and avoidance, mapping of the ocean bottom for underwater navigation, emergency management systems, warning systems, and the like.

OBJECTS OF THE INVENTIONS

It is an object of this invention to develop a database generation capability such that a database can be generated in matrix format with a high resolution for any geographical area of the world.

It is also an object of the system and method of the present invention to generate databases utilizing existing maps for any geographical area of the world.

It is also an object of the system and method of the present invention to generate such digital databases in matrix format with a high resolution in a relatively short period of time.

It is another object of the system and method of the present invention to minimize errors due to human implementation of manual tasks.

It is a further object of the system and method of the present invention to provide such digital databases in matrix format at a lower cost by minimizing the number of manhours required to generate such databases.

It is another object of the system and method of the present invention that such digitized databases substantially match the map sources from which they are derived.

It is a further object of the system and method of the present invention to generate a digitized map database with a plurality of selectable features for each data point in the database.

These and other objects are achieved in accordance with the system and method of the present invention.

SUMMARY OF THE INVENTION

The present invention relates to a generic database generator that is composed of a combination of hardware and software systems. The invention is capable of digitizing a source by extracting selected features from the source using pattern recognition, feature extraction and interactive editing routines. The output resulting from this process is a digitized database in matrix format made up of individual files of selected features each having the resolution to meet the requirements of the database. These separate feature files allow application programs to analyze and display the data in these files with a minimum amount of processing.

More specifically, the present invention is a generic map database generator system and method. The invention is capable of digitizing a paper map by extracting each of the separate terrain features (roads, railroads, vegetation, contours, drainage, and the like) from the map using pattern recognition, feature extraction and interactive editing software.

The preferred embodiment of the present invention includes a work station from which the user controls the processing, which is performed by a computer, and performs the interactive tasks. The work station consists of two color monitors for viewing interim and final files of the digitized map database, two interactive display units for communicating directly to the computer, and a digitizing tablet for performing the interactive tasks. The monitors each interface with the computer through a display generator unit. A scanner is used to obtain the initial data from the map source, which is sent directly to the computer and is then stored on a magnetic tape unit or a disk drive.

In operation, the preferred embodiment of the present invention consists of first scanning sections of a paper map source to obtain intensity files of red, green and blue in matrix format for each map section. Next, for each map section, feature files of red, green, blue and black are extracted from the intensity files of each map section. Then the green feature file of each map section is processed to produce a vegetation file for each map section. The blue feature file of each map section is processed to produce an hydrography file for each map section. The black feature file and red feature file for each map section are processed to produce a lines of communication file and a miscellaneous features file for each map section. The red feature file for each map section is processed to produce a terrain elevation file for each map section. The respective files for each map section then are combined to produce one vegetation file, one hydrography file, one lines of communication file, one miscellaneous features file, and one terrain elevation file, which collectively become the digitized map database in matrix format having a required resolution.

BRIEF DESCRIPTION OF THE DRAWINGS

The system and method of the present invention as defined by the claims is better understood in view of the following figures and detailed description.

FIG. 8 is a black and white hard copy of a blue feature file image for the map section of FIG. 3, before the labels have been removed;

FIG. 14A shows a processed area before the smoothing routine is performed in the present invention;

FIG. 14B shows the processed area of FIG. 14A after the smoothing routine is performed in the present invention;

FIG. 15 shows a representative arrangement of map section files for the map section seaming function in the present invention;

DETAILED DESCRIPTION OF THE PREFERRED EMBODIMENT

Table of Contents

I. GENERAL SYSTEM AND METHOD DESCRIPTION

II. SPECIFIC PROCESSING DESCRIPTIONS
   A. Scanning
   B. Vegetation
      1. Enhancing Feature File
      2. Template Matching
      3. Region Growing
      4. Smoothing
      5. Seaming Map Sections
   C. Hydrography
   D. Lines of Communication and Miscellaneous Features
   E. Terrain Elevation

I. GENERAL SYSTEM AND METHOD DESCRIPTION

Figure 1:
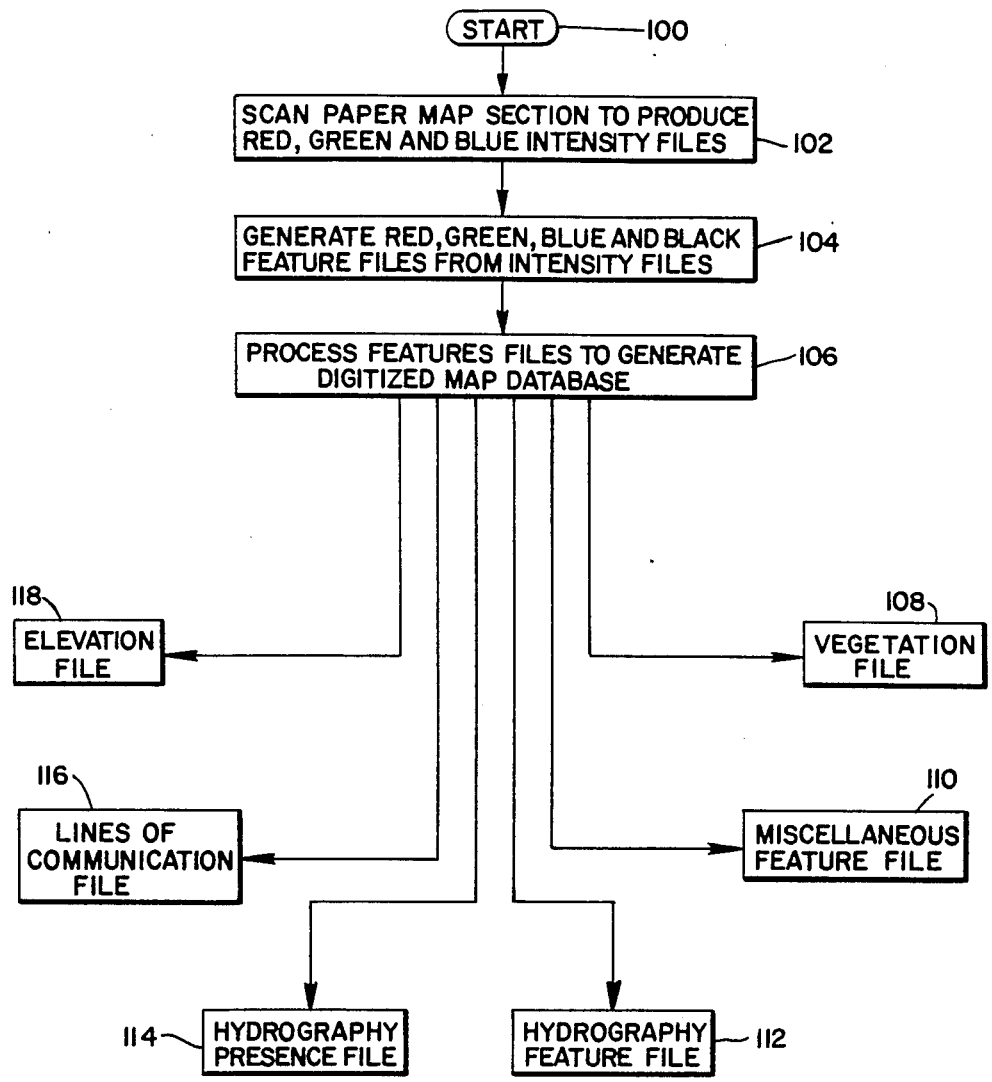
FIG. 1 is a flow chart of the preferred embodiment of the system of the present invention.

FIG. 1 is a generalized flow chart of the generic database generator system and method of the present invention. In general, the system and method of the present invention permits the user to extract selected features from a source input, to process such features, and to store them as required in the database file(s).

In the preferred embodiment, the source is a topographical paper map. Broadly, as represented in FIG. 1, the paper map is first scanned in a step 102 to produce intensity files of, for example, red, green and blue. The red, green and blue intensity files represent the basic colors that can be extracted from a color source, such as a paper map, or displayed on a color monitor. In a step 104, the intensity files are processed. All red features are extracted to create a red feature file. All green features are extracted to create a green feature file. All blue features are extracted to create a blue feature file. And all black features are extracted to create a black feature file.

In a step 106, the red, green, blue and black feature files are processed to generate a digitized map database. In the preferred embodiment, the database generated from the map source consists of a vegetation file as shown in a step 108, a miscellaneous features file as shown in a step 110, an hydrography feature file as shown in a step 112, an hydrography presence file as shown in a step in 114, a lines of communication file as shown in a step 116, and an elevation file as shown in a step 118.

Figure 2:
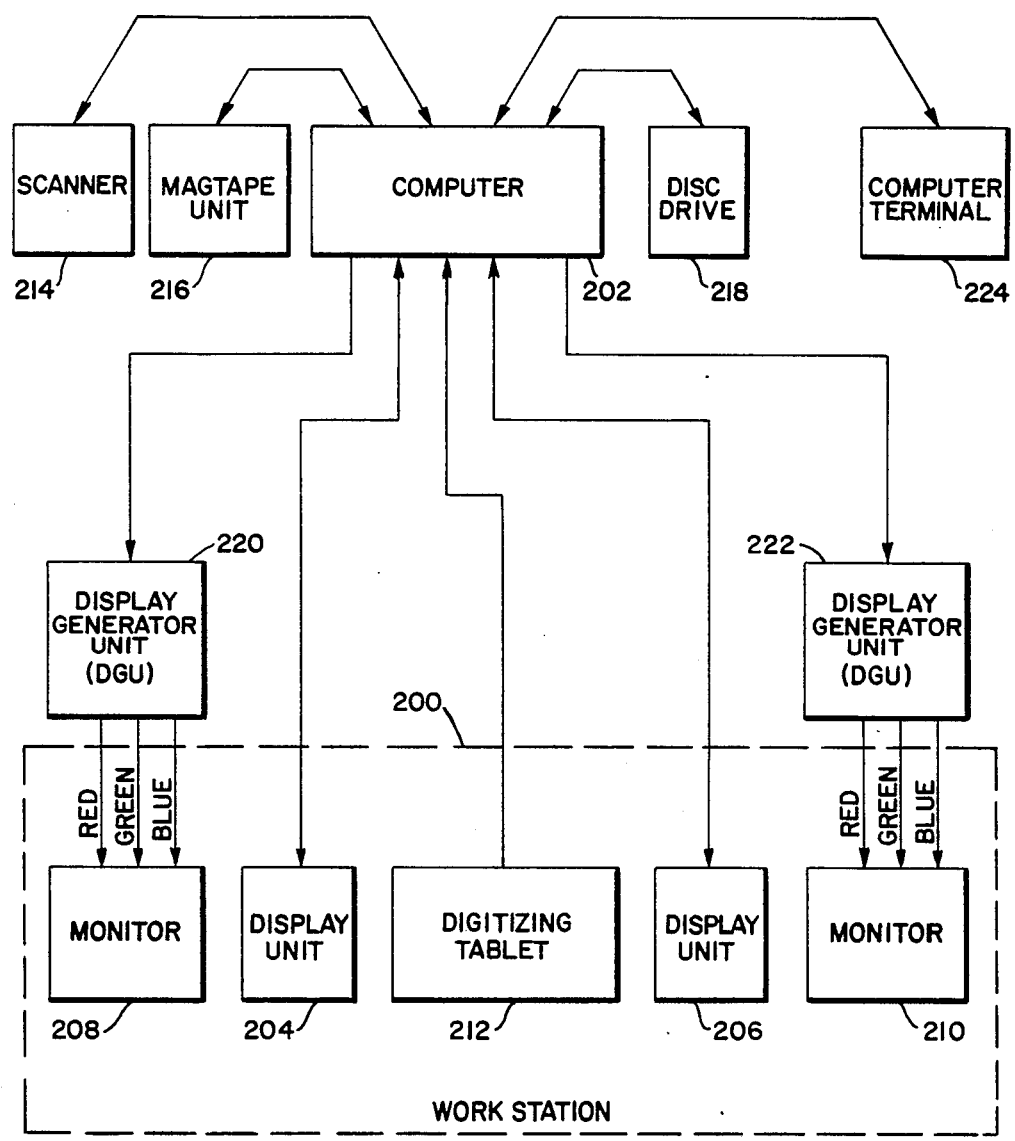
FIG. 2 is a block diagram of hardware used in the preferred embodiment of the present invention.

FIG. 2 represents broadly in block diagram form the hardware of the present invention. The user, from a work station 200, can control the processing performed in a computer 202, through display units 204 or 206. Any of the files created during the processing can be monitored by the user on color monitors 208 or 210. A digitizing tablet 212 is used to control the cursor and tag data points during the interactive segments of the processing.

The paper map source (not shown in FIG. 2) is scanned using a scanner 214. The intensity files generated by scanner 214 are sent to computer 202, and are stored on a magnetic tape unit 216 or a disk drive 218. The choice of storage media will vary depending on the size of the files being created and the ultimate size of the database. The intensity files and other files produced during the processing including the digitized map database can also be displayed at work station 200 on monitors 208 or 210 through display generator units 220 or 222, respectively. A display unit 224 is used as a terminal for computer 202. It should be noted that other hardware configurations providing the equivalent capabilities can be used in the present invention.

Figure 3:
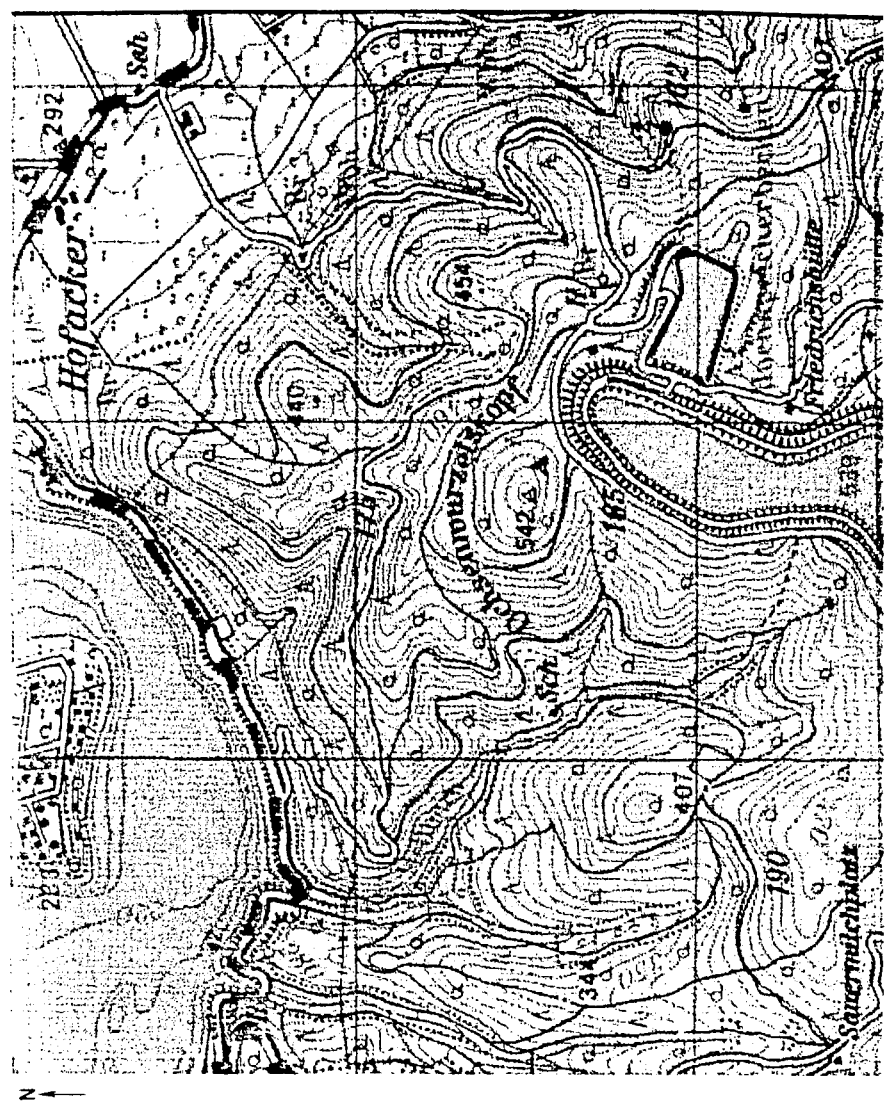
FIG. 3 is a black and white hard copy of an initial image displayed by the present invention after the scanning a map section.

FIGS. 3 through 10 show sample images obtained from the files created during the processing of a map section in accordance with the present invention. FIG. 3 is a black and white hard copy of the displayed image for the three intensity files of a map section. Immediately after the map section is scanned, or at any other time during the processing, the user can select through display unit 204 or 206 the image of the intensity files for that map section. After the feature files have been created in step 104 of FIG. 1, the user can dispay the individual feature files.

Figure 4:
FIG. 4 is a black and white hard copy of a black feature file image for the map section of FIG. 3.
Figure 5:
FIG. 5 is a black and white hard copy of a green feature file image for the map section of FIG. 3.
Figure 6:
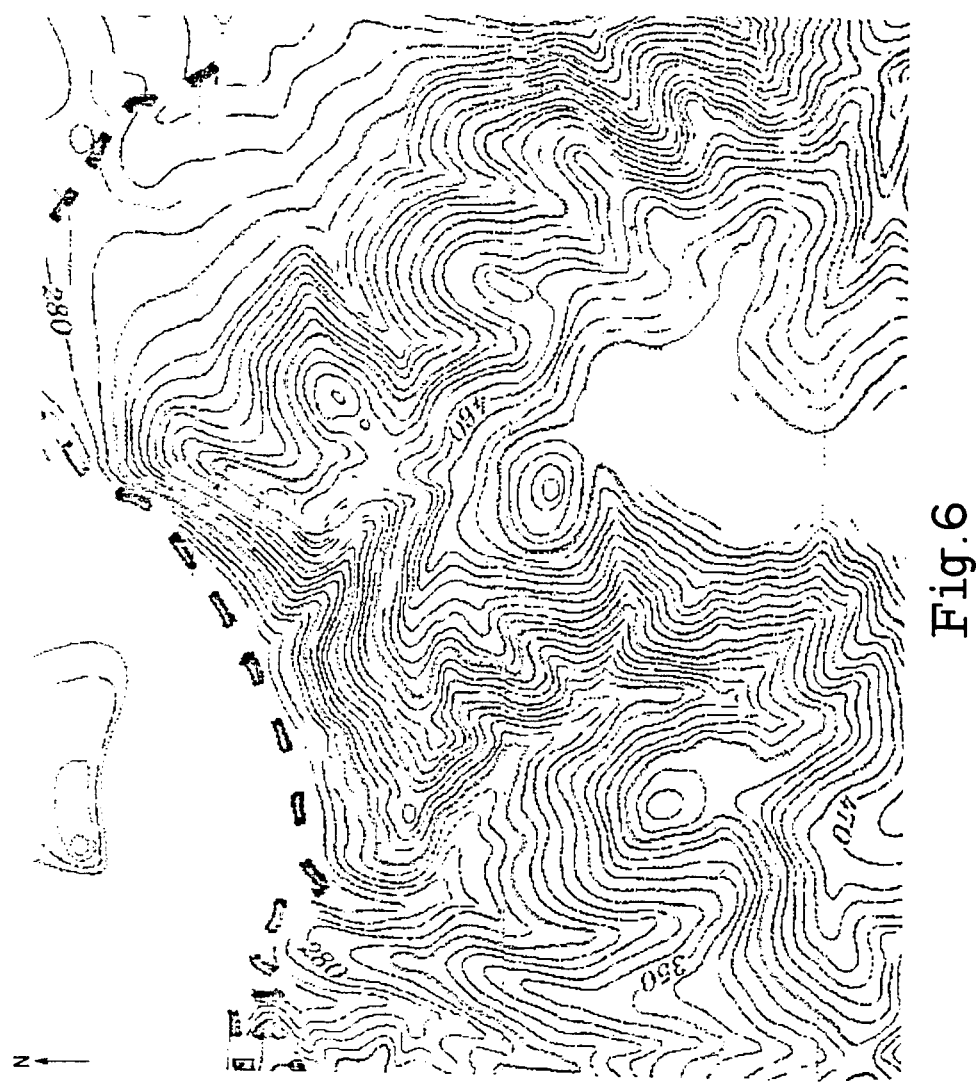
FIG. 6 is a black and white hard copy of a red feature file image for the map section of FIG. 3.

FIG. 4 is a hard copy of the black feature file in a negative format, for the map section of FIG. 3. FIG. 5 is a black and white hard copy of the green feature file for the map section of FIG. 3. FIG. 6 is a black and white hard copy of a red feature file for the map section of FIG. 3.

Figure 7:
FIG. 7 is a black and white hard copy of a vegetation file image for a map section including the map section of FIG. 3.
Figure 9:
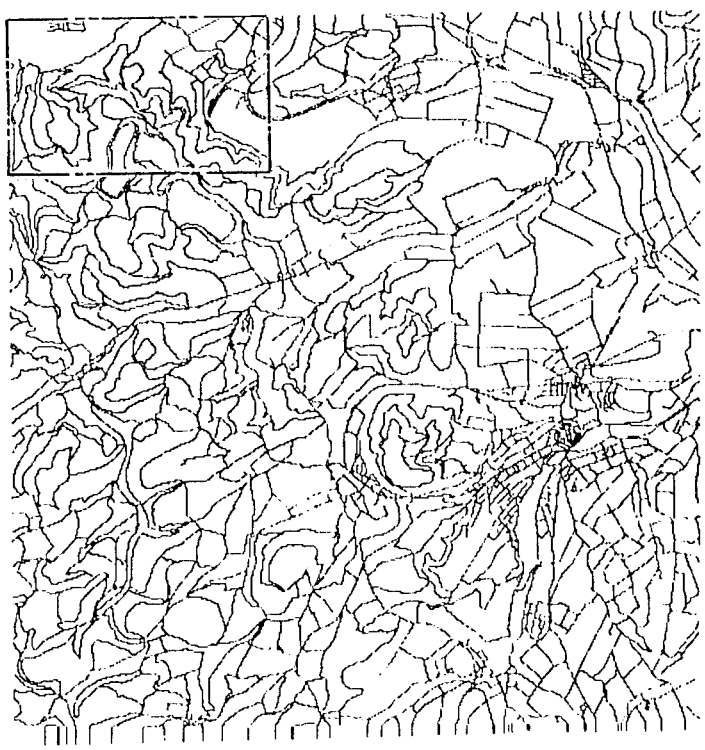
FIG. 9 is a black and white hard copy of a lines of communication and miscellaneous features file for a map section including the map section of FIG. 3.

After the feature files have been processed in step 106 of FIG. 1, the user can select the vegetation file image through display unit 204 or 206 for displaying on monitor 208 or 210, respectively. FIG. 7 is a black and white hard copy of the vegetation file image for a larger area of the map, including the map section of Section 3, after the vegetation file has been condensed, wherein the different shades of black represent the codes assigned to the different vegetation types in the file. FIG. 8 is a black and white hard copy of a blue feature file image for the map section of FIG. 3. FIG. 9 is a black and white hard copy of a lines of communication and miscellaneous features file image for a larger area of the map, including the map section of FIG. 3, after the file has been condensed. The block drawn in the northwest corner of FIGS. 7 and 9 correspond to the map section of FIG. 3.

Figure 10:
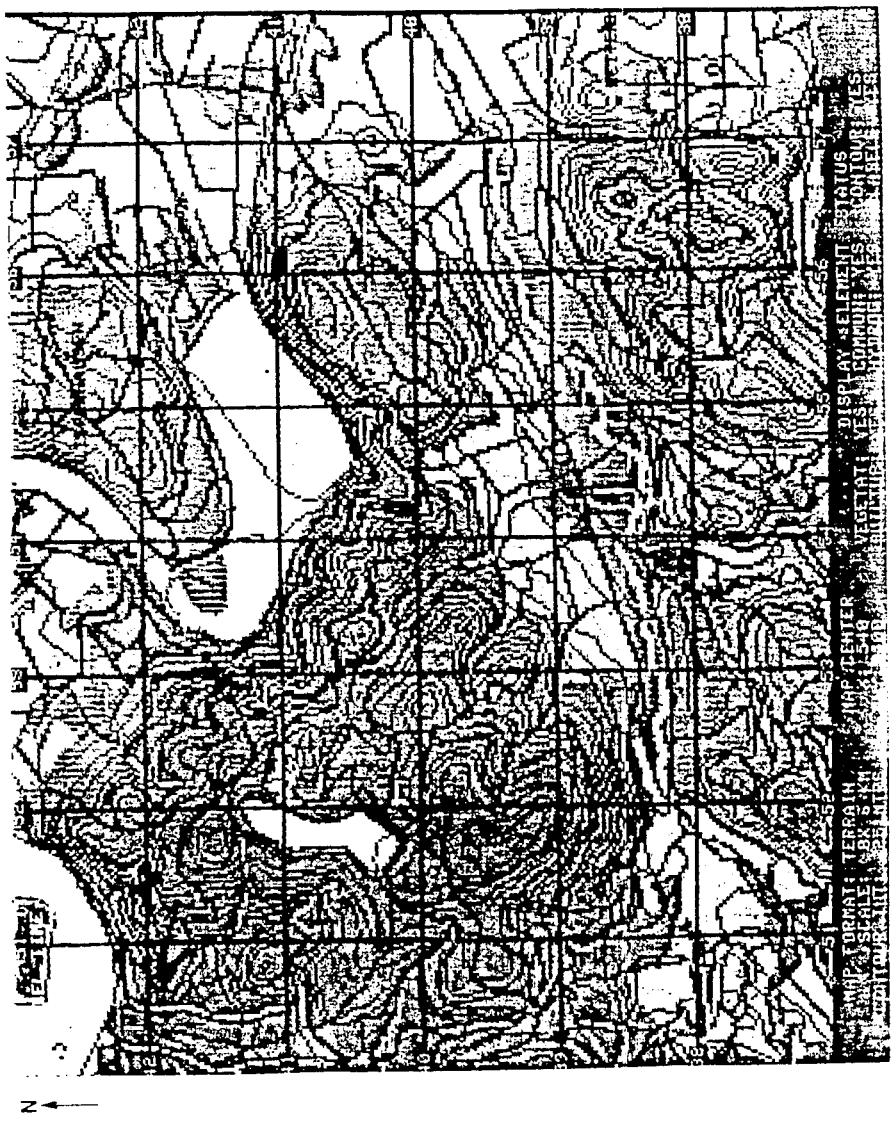
FIG. 10 is a black and white hard copy of the image displayed from the final database for a map section including the map section of FIG. 3.

Once the database has been finalized the user can then choose to display the map image as produced by the final database files. FIG. 10 is a black and white hard copy of the image displayed from the digitized map database for a map section including the map section of FIG. 3.

Using the present invention, the processing time for generating from an average topographical paper map a digitized map database in matrix format with high resolution is estimated to be one-sixth of the time it would take to accomplish the same task manually. The system and method of the present invention is flexible in that only the features required in the database need to be processed and non-wanted features can be ignored or removed. The use of separate feature files also significantly reduces the processing time required of application programs used to analyze or display the data of a particular feature file.

II. SPECIFIC DATABASE PROCESSING DESCRIPTIONS

The following sections describe in detail the specific database processing of the preferred embodiment of the system and method of the present invention. It should be understood, however, that the database processing described below represents the present best mode of implementing the system and method of the present invention and should not be construed as limiting the basic concept of the present invention.

A. Scanning

Referring again now to FIG. 2, a suitable form for scanner 214 is the Optronics 4100 scanner (sold by Optronics International, Inc. of Chelmsford, Mass.) which can scan a maximum of a 23 cm×23 cm window. It should be understood that scanner 214 is not limited to the Optronics 4100, and that other conventional scanners having similar scanning and resolution capabilities can be utilized. The Optronics 4100 creates the scan files in matrix format.

A typical topographical paper map is much larger than the 23 cm×23 cm window of scanner 214. Therefore, before any scanning can be accomplished, the paper map must be cut up into sections small enough to fit on the window of scanner 214.

Figure 11:
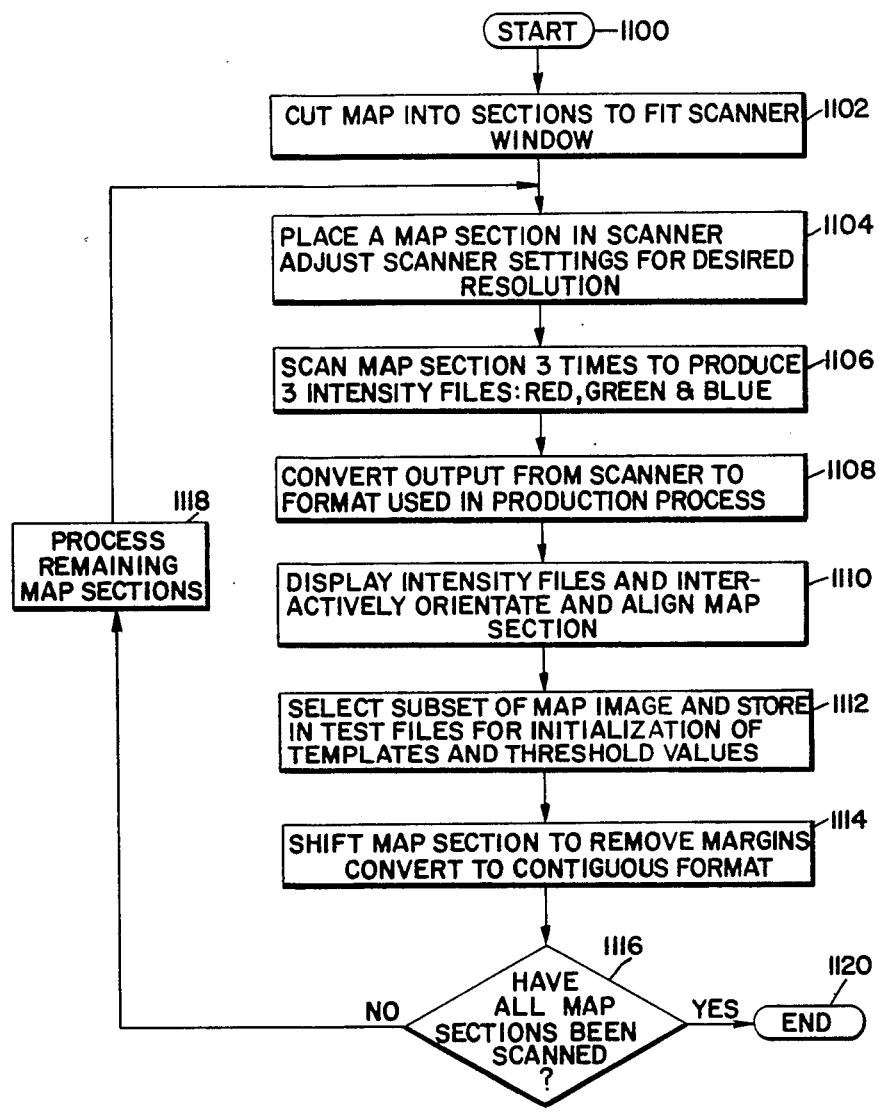
FIG. 11 is a flow chart of the scanning operation of the present invention.

Referring now to FIG. 11, in the preferred embodiment, the map is cut into 20 cm×20 cm sections as represented by a step 1102. By cutting the map sections to this size, a 1.5 centimeter margin of error on each side of the map section is available. Also the size of the map sections provides a convenient factor for determining the number of map sections,—for example, on a 1:50,000 scale map, 10 km is approximately equal to 20 cm. Therefore, each map section is a 10 km×10 km section of the map. Once the paper map has been cut into sections each section is placed upon a background piece of paper, having a size of at least 23 cm×23 cm. This reduces the chance of damage to the map sections during the mounting of the map sections onto the window of scanner 214.

As shown in a step 1104, the map section is placed in scanner 214 and adjustments are made to the settings of scanner 214 so that the desired resolution can be obtained from the scan. The settings of scanner 214 are set for a predetermined value, for example, 100 lines per centimeter. Scanning at this resolution provides for a high resolution in the intensity files. It should be understood that the scanning resolution can be increased or decreased depending on the resolution desired.

It should be understood that a scan of a paper map source would produce a negative image, that is a reflective intensity, because the light is reflected off of the source. If the map source is in the form of a transparency or a negative, the intensity file would contain the positive image of the scanned source. Thus, the term intensity file as used herein, refers to the files produced from the scans from either of these two situations.

Thereafter, as shown in a step 1106 the map section is scanned three times, each time producing one of the three intensity files of red, green and blue. These files are referred to as intensity files because the sanner produces an output file in matrix format for each of the three colors. The output file for a color contains for each point on this map the intensity of that color for that point, that is each data point in the red intensity file represents the intensity (for example, in the range of 0-255) of the color red as recorded for that data point during the scan.

The intensity files are then transferred to computer 202 and stored in magnetic tape unit 216 or disk drive 218 (not shown in FIG. 11). A suitable form for computer 202 is the Perkin-Elmer 3210 sold by Perkin-Elmer Corporation of Oceanport, N.J. It should be understood that computer 202 is not limited to the Perkin-Elmer 3210 and that other conventional computers having similar capabilities can be utilized.

In the preferred embodiment the intensity files produced by scanner 214 are stored in an indexed file format. For example, in the preferred embodiment each intensity file contains 2,290 records per map section and 2,290 bytes of data per record. The scanning of each map section produces three files: a red intensity file, a green intensity file and a blue intensity file. The three intensity files for each map section are converted in a step 1108 to a format suitable for further processing. The indexed intensity files are converted to contiguous files. For example, in the preferred embodiment each intensity file contains 20,610 sectors (nine sectors per scan line) in contiguous file format.

The user can now request the display of the map section image consisting of the three intensity files, as indicated in a step 1110. The user makes his request through display unit 204 or 206. The contiguous intensity files for the map section, which have been stored in magnetic tape unit 216 or disk drive 218 are transferred by computer 202 to display generator 220 or 222. The map section intensity files image is now displayed on monitor 208 or 210. FIG. 3 shows a black and white copy of a sample map section image. A suitable form for display units 204 and 206 is the Perkin-Elmer 1251 display. It should be understood that display unit 204 or 206 is not limited to the Perkin-Elmer 1251 and that other conventional displays having similar capabilities can be utilized. A suitable form for display generator 220 and 222 is the Lexidata 3400 display generator, sold by Lexidata Corporation of Billerica, Mass. It should be understood that display generator 220 or 222 is not limited to the Lexidata 3400 and that other conventional display generators having similar capabilties can be utilized. A suitable form for monitor 208 or 210 is the Lexidata 3452-9-LP monitor. It should be understood that monitor 208 or 210 is not limited to the Lexidata 3452-9-LP and that other conventional monitors having similar capabilities can be utilized.

Returning now to FIG. 11, if the map section is displayed sideways or backwards, a task is initiated interactively in step 1110 to orientate and align the map section image. In a step 1112, a subset of the map section image is extracted and stored in a test file for later use in the initialization of templates and threshold values for the map section. In the preferred embodiment, the subset of the map section is of a preselected size, for example, a 256 by 256 matrix subset.

When the paper map is scanned in step 1104, a 1.5 cm margin is left on each side of the map section. That margin is now removed in a step 1114 so that the northwest corner point of the map section intensity files contain the first valid point of the map section. This is accomplished by first shifting the map section east to west and then south to north. In the preferred embodiment this task is initiated interactively using tablet 212. To shift the map section east to west, two datapoints, representing the northwest corner and the southwest corner of the map section, are identified using tablet 212. To shift the map in the north/south direction the tablet is used to select points at the top of the map section on the left and right corners. A suitable form for tablet 212 is the Summagraphics Bitpad I sold by Summagraphics Corporation of Fairfield, Conn. It should be understood that tablet 212 is not limited to the Summagraphics Bitpad I and that other conventional tablets having similar capabilities can be utilized.

A check is then made to determine if all map sections have been processed, as indicated in a decision step 1116. If not, the remaining map sections are processed as indicated in a step 1198, and the processing is returned to step 1104. Once all map sections have been processed, the intensity files for each map section are ready for further processing as indicated in an END step 1120.

B. Vegetation

Figure 12:
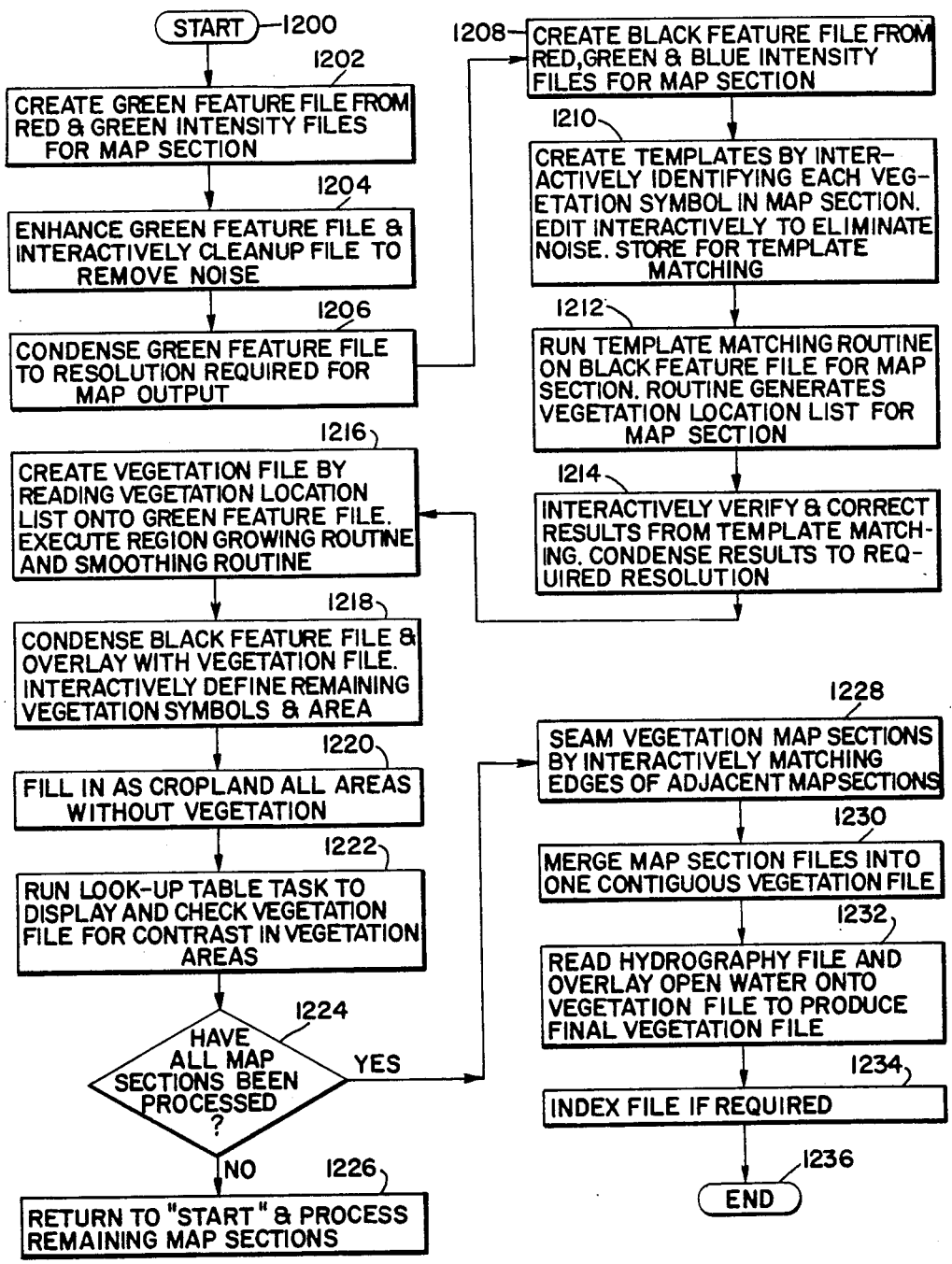
FIG. 12 is a flow chart of the vegetation coverage processing of the present invention.

The production of the vegetation file begins with the red, green and blue intensity files which were produced in step 1106 in FIG. 11. Referring now to FIG. 12, a green feature file is created from the intensity files of a map section in a step 1202. FIG. 5 shows a black and white copy of a green feature file image for a map section. A typical topographical map is separated into two colors for vegetation: green for forest and white for other vegetation. Symbols are disbursed across the topographical map to represent all vegetation types. The green feature file represents the forest vegetation for the map section and contains a 1 or 0 in each data point, where 1 indicates green and 0 indicates non-green.

1. Enhancing Feature File

Returning now to FIG. 12, the green feature file is enhanced by running a density map routine on the green feature file as indicated in a step 1204. Enhancement of the green feature file is needed to fill in the discontinuities of the green features obtained from the intensity files. FIG. 5 shows a black and white image of the green feature file before it has been enhanced. The green features in FIG. 5 are "dotted" rather than contiguous as on the paper map. The density map routine fills in the discontinuities in the green feature file.

In the preferred embodiment the density map routine of step 1204 automatically surrounds each point in the green feature file with a window of a predetermined size. In the preferred embodiment the window size is 5 points by 5 points. The density of the window for a point, that is, the number of green points in the window, is determined and then stored for such point in an enhanced green feature file. The density map routine is automtically performed on each point in the green feature file to produce the enhanced green feature file. The user then interactively performs a cleanup task on the enhanced green feature file to remove any noise. The term "noise" as used herein includes all data that is unwanted during the immediate processing. In the preferred embodiment the cleanup task is an interactive editing task where the user eliminates the noise by using tablet 212 to draw a rectangle or polygon around the area to be removed as noise, and then pressing the function key on the tablet 212 to effect the removal of the noise.

In a step 1206, the enhanced green feature file is condensed to the resolution required for the digitized map database. In the preferred embodiment the files are condensed to preselected value, for example, 40 lines per kilometer. It should be understood that the resolution resulting from this step may vary according to the need for each database.

In a step 1208, a black feature file is then created from the red, green and blue intensity files for the map section. The black feature file contains all features on the paper map section which appear in black. FIG. 4 shows a copy of a negative image of a black feature file for a map section. Such features include: vegetation symbols, text, grid lines and the like. To obtain the black feature file for the map section a routine to automatically extract all black features from the map section is executed.

2. Template Matching

Figure 13A:
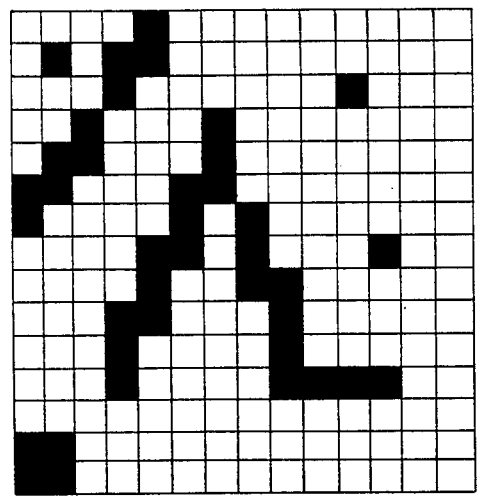
FIG. 13A shows a symbol selected in the present invention for definition as a template before noise is removed.
Figure 13B:
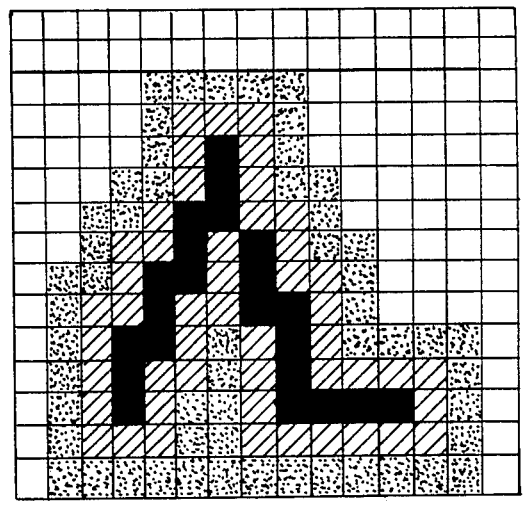
FIG. 13B shows a symbol defined as a template in the present invention.

Before extracting vegetation symbols from the black feature file for the map section it is necessary to create a template file which associates each vegetation symbol on the map section with a vegetation type. Returning now to FIG. 12, using the legend on the paper map a template file is created as indicated in a step 1210 by interactively defining each type of vegetation symbol in the map section. This is accomplished through a routine which used the test file made in step 1112 (FIG. 11) for the map section. The 256 by 256 point test file is displayed on monitor 208 or 210. With this subset of the map section displayed on the monitor 208 or 210, diagonal points, which define a rectangle that surrounds the symbol to be made into a template are selected interactively by using tablet 212. The symbol is then displayed separately from the subset of the map section and expanded to fill one quarter of monitor 208 or 210 for editing purposes. FIG. 13A represents the rectangular area containing the symbol and noise. Editing is performed to eliminate the noise in the rectangular area and is accomplished through use of tablet 212 using the cursor to identify the noise as was done in step 1204. Once the noise has been eliminated, an outline is drawn around the expanded symbol automatically. This is then edited interactively through tablet 212 to correct for errors. Finally, a second outline is drawn automatically around the symbol and edited once again interactively. FIG. 13B shows the edited symbol surrounded by the two outlines. The final template symbol is stored for use in the template matching routine.

In the preferred embodiment templates are only created for two vegetation symbols: deciduous forest and coniferous forest. It should be understood that templates can be created for other vegetation symbols appearing in the map section. In the preferred embodiment such additional symbols are defined in a step 1218.

When the symbol templates have been created in step 1212, the template matching routine is run on the black feature file for the map section. In the preferred embodiment, the template matching routine in step 1208 in the preferred embodiment utilizes three ratios to determine whether a symbol in the black feature file matches a symbol template.

$$\text{symbol ratio} = \frac{\text{No. of symbol points matched}}{\text{No. of points in template symbol}} \quad (1)$$

$$\text{first ring ratio} = \frac{\text{No. of points matched around symbol}}{\text{No. of points around template symbol (first ring)}} \quad (2)$$

$$\text{second ring ratio} = \frac{\text{No. of points 2 spaces from symbol which do not equal symbol value}}{\text{No. of points 2 spaces from symbol in template}} \quad (3)$$

Once the ratios have been obtained by the template matching routine of step 1212, an analysis is used to establish a match as follows: If the symbol ratio is greater than or equal to a predetermined threshold ratio for the symbol ratio, and the first ring ratio is greater than or equal to a predetermined threshold ratio for the first ring ratio, and the second ring ratio to greater than or equal to a predetermined threshold ratio for the second ring ratio, then the vegetation symbol matches the template. The threshold ratios can be selected by a trial and error method. In the preferred embodiment the threshold values are: symbol ratio, 69%; first ring ratio, 74%; and second ring ratio, 64%. It should be understood that no match indicates the absence of any defined vegetation symbol at that point.

The output from this template matching routine is a list of X/Y coordinates in the map section having vegetation symbols which match with vegetation types. This data is stored as a vegetation location list for the map section.

Returning now to FIG. 12, once the template matching has been completed and the list of vegetation locations have been produced the symbol locations are verified interactively in a step 1214. The black feature file for the map section is displayed again on monitor 208 or 210 with colored identification marks showing where a template has been matched with a vegetation symbol on the map section. Each type of symbol has a preassigned color associated with it for verification. Using tablet 212, changes are made to the symbol location list by interactively adding and deleting symbol points. When all corrections have been made the vegetation location list is condensed to the resolution required of the digitized map database, as indicated by step 1214.

3. Region Growing

In a step 1216, an initial vegetation file is then created by overlaying the vegetation location list from step 1214 onto the green feature file from step 1206. A region growing routine is performed to automatically expand the forest symbols to all points within the green feature boundaries which represent forest vegetation in the map section. This growing routine is accomplished by first checking the relationship of each data point within a green feature boundary, which has a forest vegetation code from the vegetation location list, with other data points having forest vegetation codes in the green feature boundary. The region growing routine partitions areas within the green feature boundary based on forest type. An area is defined as deciduous forest when all the vegetation codes for the area are deciduous. An area is defined as coniferous forest when all the vegetation symbols for the area are coniferous. When the vegetation symbols in an area are both types the area is defined as mixed forest. Once all areas within a green feature boundary have been partitioned, the routine then begins an expansion of the vegetation codes around each data point having a vegetation code within the green feature boundary. The expansion is in all directions around each point having a vegetation code, and continues, one point at a time, until the green feature boundary is reached or another vegetation code is reached in any direction. When this occurs, the expansion is stopped for such direction and continues in the other directions. At the completion of the region growing routine each data point within the green feature areas of the map section has a vegetation code representing the type of forest in that data point.

4. Smoothing

A smoothing routine is performed on the vegetation file to smooth over all rough boundaries of the green feature, as indicated by step 1216. FIG. 14A represents two vegetation areas, with area 2 having a rough boundary. FIG. 14B represents the same two vegetation areas after the rough boundary in area 2 has been smoothed by solving four simultaneous linear equations using the Gauss-Jordan Reduction Method which is well known in that art. After the boundary is smoothed the area within the boundary is filled.

In a step 1218, the black feature file created in step 1208 is condensed to the resolution required for the digitized map database and is overlaid with the vegetation file from step 1216. The resulting image is displayed on monitor 208 or 210 to show the black features in the areas where no vegetation type has been identified. This routine allows the user to outline an area of coverage using tablet 212 so that the routine fills in the areas where the remaining vegetation symbols are located. Built up areas, such as cities, towns, villages and the like are also identified at this time.

After the remaining vegetations have been entered into the map sections in step 1218, there may be areas on the map section which have no vegetation symbols. In a step 1220, such areas are now filled in automatically with the predominant vegetation type for the geographic location. In the preferred embodiment the predominant vegetation is crop land.

In a step 1222 a lookup table routine is executed to display the vegetation file, and to give the vegetation displayed on monitor 208 or 210 a realistic representation by color. The contrast in the various vegetation shades of green can be adjusted interactively by the user.

A check if all map sections have been processed is performed in a decision step 1224. If not, processing returns to START step 1220 of the vegetation process in order to process the remaining map sections, as indicated in a step 1226. If yes, the vegetation file for each map section must be seamed together interactively in a step 1228 so that one contiguous vegetation file can be created.

5. Seaming

In step 1228 the vegetation files for the map sections are seamed by matching the edges of adjacent map sections. Up to now the map sections have been processed separately from each other. Before merging the sections together into one vegetation file, the edges of the map sections are checked, side by side, to determine if any discontinuities exist. The seaming routine accomplishes this first by displaying the north/south edges, then by displaying the east/west edges, and finally by displaying the corner of four adjacent map sections. When these edges are displayed, the cursor is used interactively by the user to fix any discontinuities that may exist.

Before performing the seaming task, it is necessary that a list of all map sections be initialized. The list should be organized according to the location of the sections to one another. FIG. 15 represents an arrangement of such a list. The squares 1 through 15 in FIG. 15 represent the map sections in the order they were scanned, which also correlates to the order of arrangement on the map source. The editing of the map section edges is completed using the same method as used in step 1218, where the remaining vegetation symbols were defined.

After all the vegetation map sections have been seamed, the map section files are merged in a step 1230 into one contiguous vegetation file for the whole map. In step a 1232, the values of the vegetation file are converted to the vegetation values required for the digitized map database. Included in this task of converting the vegetation code is addition of the open water code from the hydrography file (discussed below), which is also considered vegetation. The processing of the vegetation file is now complete and the vegetation file is in one contiguous file. FIG. 7 shows a black and white copy of a vegetation file image for several map sections after the seaming and merging tasks have been completed. Returning now to FIG. 12, in a step 1234, the file may be converted into an indexed file if required for the final digitized map database. Thereafter, the processing for vegetation is completed as indicated by an END step 1236.

C. Hydrography

Figure 16:
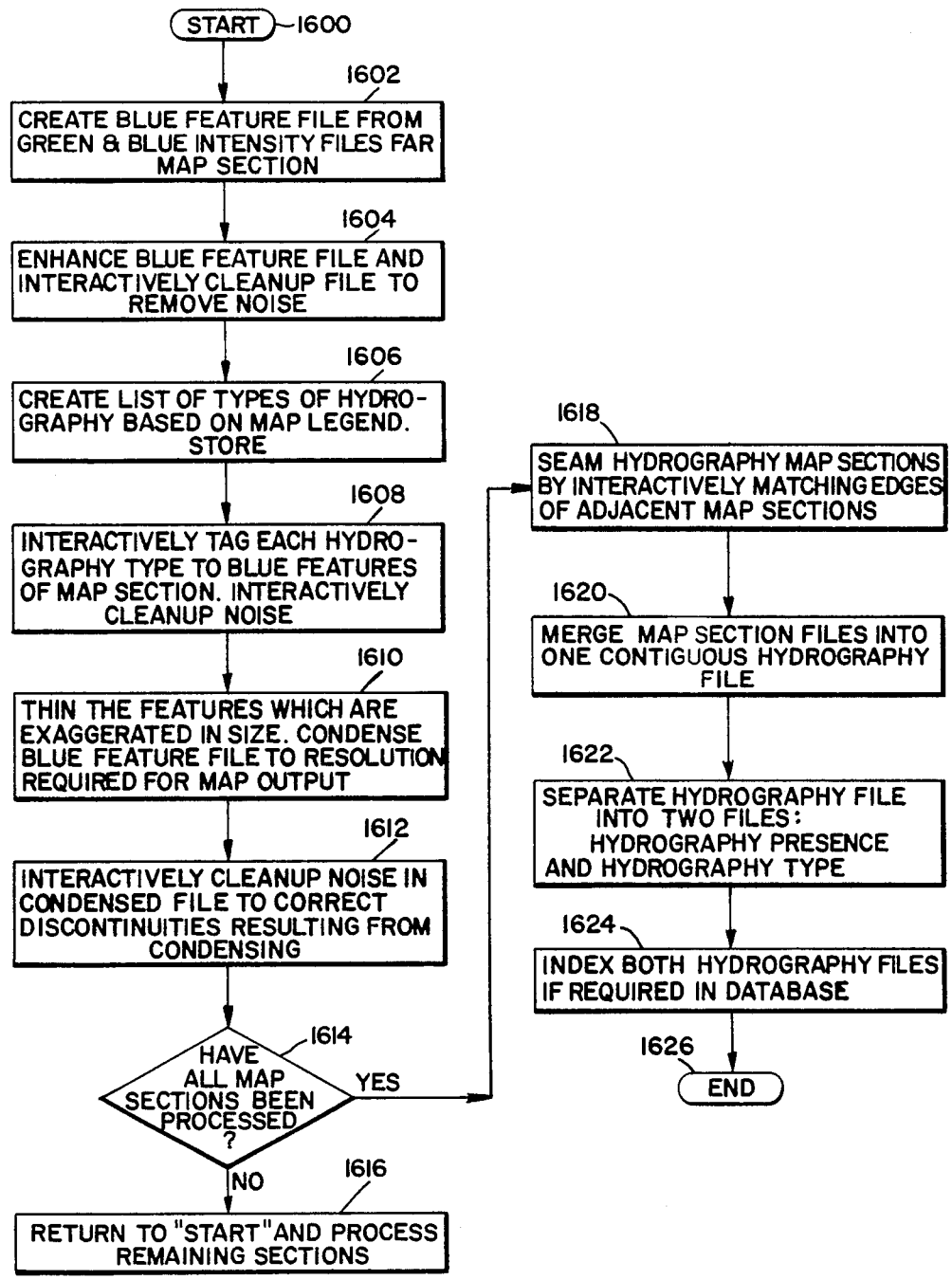
FIG. 16 is a flow chart of the hydrography processing in the present invention.

Generally, hydrography features on a map are represented by different shades of blue. The process of extracting hydrography features of a map begins with the creation of a blue feature file from the red, green and blue intensity files of a map section as shown in a step 1602 of FIG. 16. The blue feature file is enhanced in a step 1604 and cleaned up interactively to remove noise using the same method as described for step 1204 (FIG. 12) for the vegetation processing.

FIG. 8 shows a black and white copy of the blue feature file image for a map section before the labels have been removed as noise. Returning to FIG. 16, in a step 1606, a list of the types of hydrography is created interactively based on the legend for the map source and a value is assigned for each type of hydrography. In a step 1608, the hydrography types in the blue feature file are identified and tagged interactively using tablet 212. Tablet 212 is also used to eliminate areas in the blue feature file containing text, labels and noise. In step 1608, the blue feature file for the map section is displayed, edited and tagged and then stored back into the blue feature file using the same method described in step 1604.

With the hydrography types tagged in step 1608, the features which are exaggerated in size on the paper map, are thinned in a step 1610. The thinning routine in the present embodiment uses an algorithm described in "A Fast Parallel Algorithm For Thinning Digital Patterns" by T. Y. Zhang and C. Y. Suen, *Communications of the ACM*, March 19784, Volume 27, Number 3, which is incorporated referenced herein.

After the thinning routine is completed, the blue feature file is condensed to the resolution required for the digitized map database. Once the hydrography file is condensed, an editing task is run which will display the condensed hydrography file and provide the capability for correcting discontinuities resulting from the thinning process. In a step 1612, editing, such as area deletion and feature appending, is performed. A check is then made to determine if all map sections have been processed, as indicated by a decision step 1614. If not, the hydrography process returns to START step 1600 to process the next map section, as indicated by a step 1616. If yes, the processing moves to a step 1618, where the hydrography map sections are seamed together by interactively matching the edges of adjacent map sections as described in step 1228 (FIG. 12) for the vegetation process.

In a step 1620, with the seaming of the hydrography map sections completed, the files are merged into one contiguous hydrography file. In a step 1622 the hydrography feature file is then separated into two files: hydrography presence file and hydrography type file. The codes which represent the features in each file are also assigned in step 1622. Finally, in a step 1624, both hydrography files are converted to an indexed format if required for the digitized map database. Thereafter, the processing for hydrography is completed as indicated by an END step 1626.

D. Lines of Communication and Miscellaneous Features

The processing of lines of communication and miscellaneous features is performed at the same time because of the similarities regarding extraction of the features. Extracting the lines of communication and miscellaneous features for a map section source is primarily and interactive editing task where the types of roads, railroads, bridges, tunnels and other features are traced by the user using tablet 212 with the black feature file used as background for tracing these features. The legend of the map source is used to distinguish between the different types of features to be extracted. In step 1702, a file made up of a list of features is initialized interactively based on the map legend. The test data file created in step 1112 (FIG. 11) is used in defining the list of features.

On most topographical maps, the primary and secondary roads are printed red in color. Consequently, a portion of the processing for lines of communications includes processing of a red feature file created from the red, green and blue intensity files for each map section as shown in a step 1704. FIG. 6 shows a black and white copy of a red feature file image for a map section. Returning now to FIG. 17, in a step 1706, the red feature file is enhanced and cleaned up interactively to remove noise as described in step 1204 (FIG. 12) for the green feature file. Once the red feature file is enhanced it is then condensed in a step 1708 to a resolution required for the digitized map database. The enhanced condensed red feature file is interactively cleaned up once again in a step 1710 to remove any discrepancies or discontinuities that have resulted from condensing the file in step 1708. The file is then cleaned up to remove any discontinuities.

In a step 1712, a routine to automatically separate the primary and secondary roads from the rest of the red features is executed. Note that on the paper map, the lines indicating the primary and secondary roads are exaggerated for illustration purposes and are readily distinguishable over the other red features. In a step 1714, the primary and secondary road features are thinned to produce a more accurate representation of the roads in comparison to other features. The thinning routine is the same as used in step 1610 (FIG. 16) for the hydrography file processing. After the red features have been thinned any discontinuities created by the thinning routine are now interactively corrected. In a step 1716, the red features are tagged interactively as either primary or secondary roads.

In a step 1718 the lines of communication and miscellaneous features that were initialized in the list of features file in step 1702 are used for interactive tagging. The user interactively traces and tags each line of communication and miscellaneous feature that appears in the black feature file of the map section. After such tracing and tagging has been completed, a lookup table routine is run to verify the tagging. Each tagged feature has a unique color assigned to it when displayed, so that the user can distinguish the tagged features from the black features that have not been tagged.

In a step 1720, after the lines of communication and miscellaneous features have been extracted from the previous step, the extracted feature file is condensed to the resolution required for the digitized map database. In a step 1722, the red feature file from step 1716 and the extracted feature file from 1720 are merged to make one contiguous lines of communication and miscellaneous features file for the map section.

A check is made to determine if all map sections have been processed, as indicated by a decision step 1724. If not, processing returns to the beginning of the lines of communication and miscellaneous features process START step 1700 to process the remaining map sections, as indicated by a step 1726. If yes, the lines of communication and miscellaneous features map sections are seamed together interactively in a step 1728 by matching the edges of the adjacent map sections using the same method as in step 1228 (FIG. 12) for the vegetation file. In a step 1730, the map section files are merged together to create one contiguous lines of communication and miscellaneous features file. FIG. 9 shows a black and white copy of a lines of communication and miscellaneous features file image for several map sections after the seaming and merging tasks have been completed. Returning now to FIG. 17, in step 1730, this file is then separated into one contiguous lines of communication file and one contiguous features file. Along with separating the data codes representing each feature, the final output values for the digitized map database will be assigned. In a step 1732, the contiguous files are converted to indexed files if required for the digitized map database. Thereafter, the processing of lines of communication and miscellaneous features is completed, as indicated by an END step 1734.

E. Terrain Elevation

Terrain elevation on a paper map is represented by contour lines. The following process extracts the contour lines from the map by color separation. Color separation does not completely separate the contours from the other features. It does however make contours more pronounced and less difficult to detect.

Figure 17:
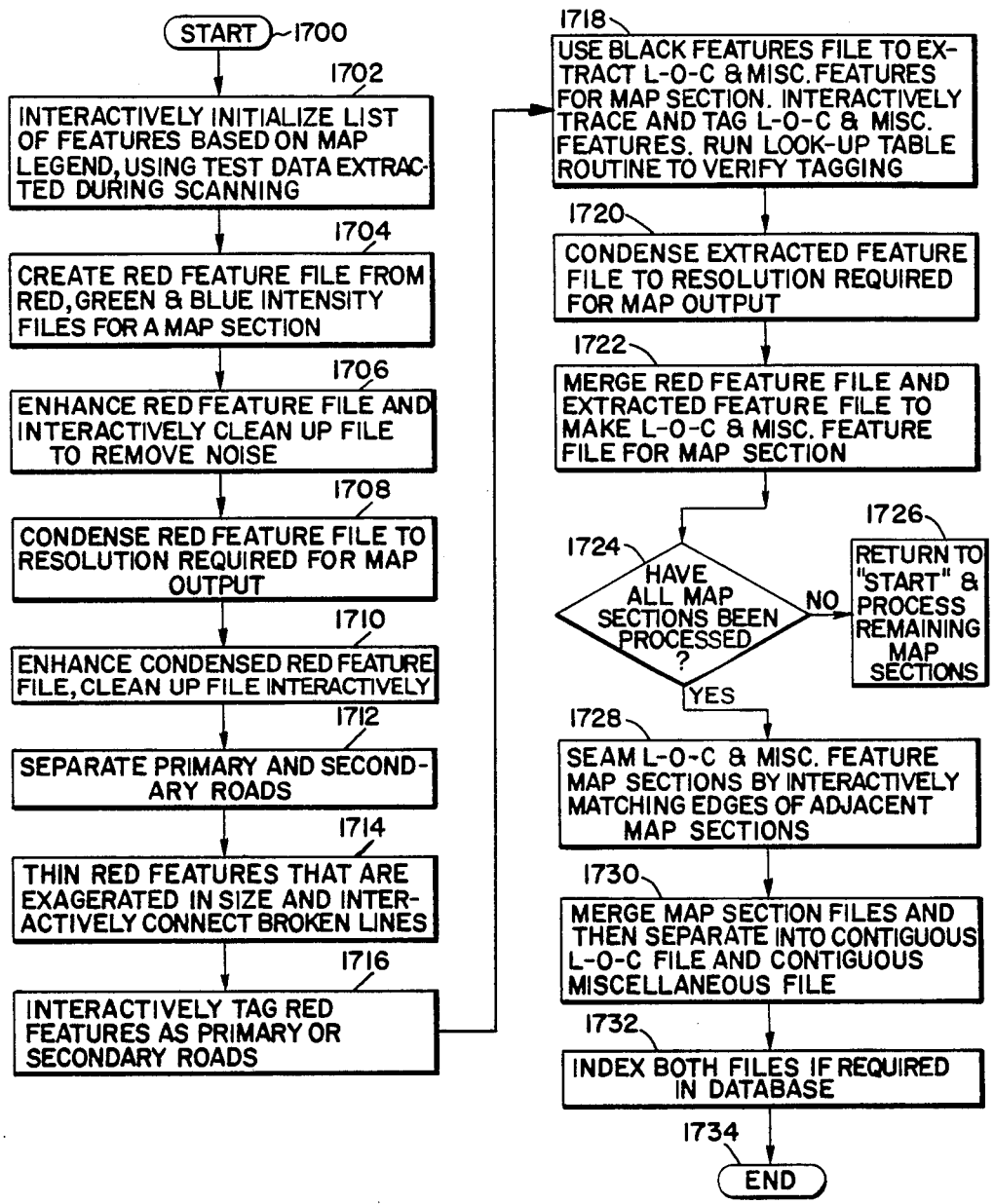
FIG. 17 is a flow chart of the lines of communication and miscellaneous features processing in the present invention.
Figure 18:
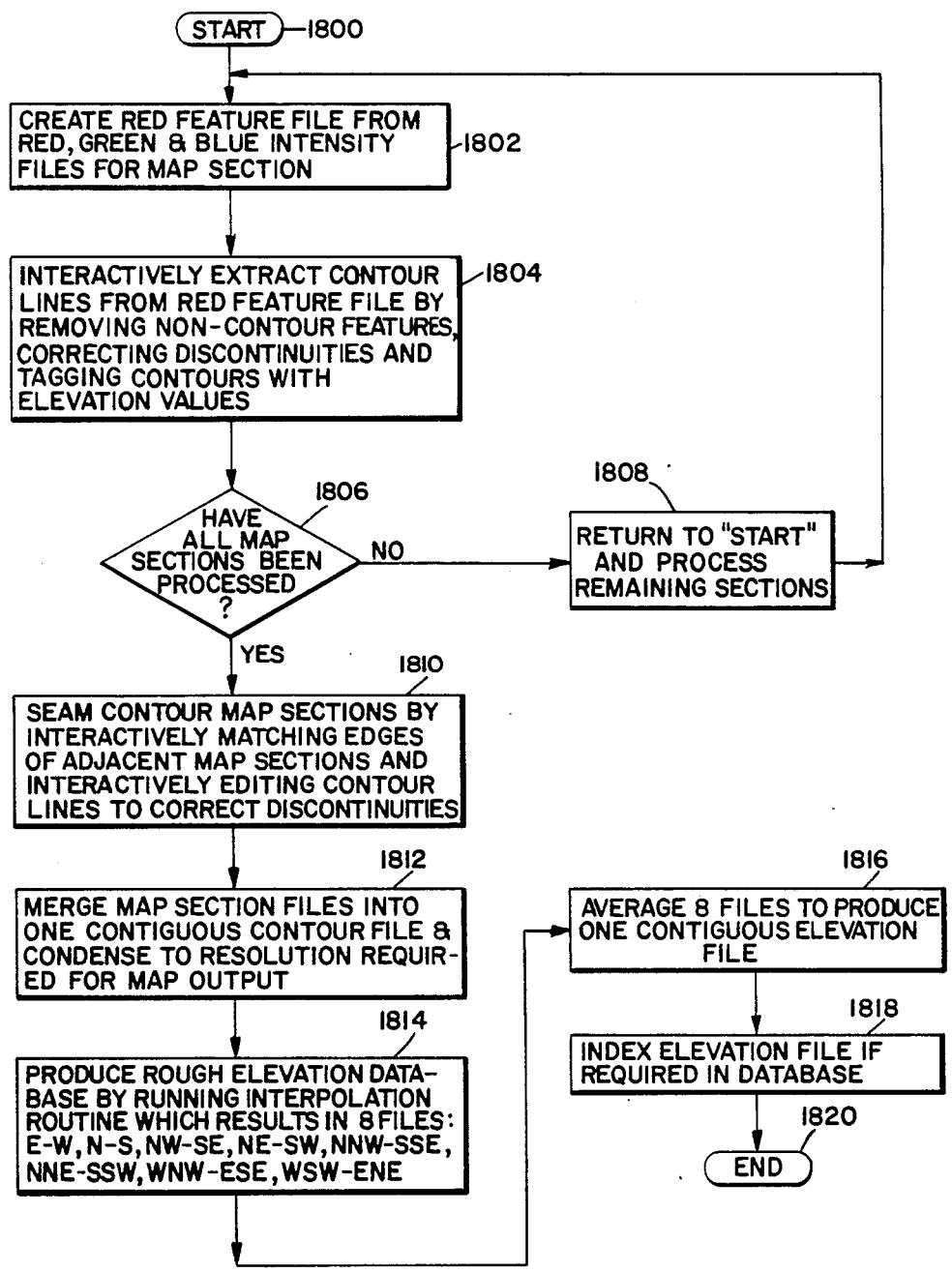
FIG. 18 is a flow chart of the terrain elevation processing in the present invention.

Referring now to FIG. 18, the red feature file is created from the red, green and blue intensity files for the map section as indicated by a step 1802. It can be noted that this feature file has been created previously in step 1704 (FIG. 17). However, any one of the processes can be performed exclusive of the other processes and in any order. Therefore, if the red feature film already exists, step 1802 would be bypassed.

The extraction of contour lines from the scanned red, green and blue intensity files involves first the extraction of contours by color separation. Other features which are close to the color of the contours will also be extracted. In a step 1804, an interactive editing function using tablet 212 provides the user the capability to eliminate the non-contour features, to correct any contour discontinuities, and to tag the contours with elevation values. After step 1804, all contour features for the map section have been tagged and given elevation values.

A check to determine if all map sections have been processed is then performed as indicated by a decision step 1806. If not, processing returns to the start of the process for terrain elevation and the remaining sections are processed, as indicated by a step 1808. If yes, the terrain elevation files for the map sections are seamed together in the north/south and east/west directions in a step 1810. This seaming is the same method as used in step 1228 (FIG. 12) for the vegetation file. Since the contours have been extracted in each map section independently from the contours in other map sections, the contour lines between each map section may not be aligned. An interactive editing routine allows the user to correct for any discontinuities in the contour lines, as indicated in step 1810. The editing routine provides for a deletion function, a join contour line function and a tag contour line function.

After the terrain elevation map section files have been seamed, the files are condensed to the resolution required for the digitized map database, as indicated in a step 1812. The condensed map section files are then merged into one contiguous terrain elevation file. In a step 1814, linear interpolation is performed on the contour line data in the terrain elevation file to produce a rough elevation database. The interpolation is done in eight directions: east to west, north to south, northwest to southeast, northeast to southeast, north northwest to south southeast, north northeast to south southwest, west northwest to east southeast and west southwest to east northeast. The results of this interpolation are stored in eight files, with each file representing one direction. In a step 1816, the files are averaged to produce one contiguous terrain elevation file for the map section. In a step 1818, the terrain elevation file is converted to an index format if required for the digitized map database. Thereafter, the processing of terrain elevation is completed, as indicated by END step 1820.

It should be understood that the processing of a paper map source in the present invention is not limited to four feature files of red, green, blue and black. The present invention is adaptable to any type or color feature. It should be understood also, that additional features, such as soil type, can be processed using the system and method of the present invention. However, such additional feature processing was not required in the preferred embodiment.

Obviously, numerous modifications and variations of the present invention are possible in view of the above teachings. It is therefore to be understood that within the scope of the appended claims the invention may be practiced otherwise than as specifically described herein.

We claim:

1. A method for generating a digitized map database comprising the steps of:
   (a) scanning a map source to obtain digitized raw data in matrix format;
   (b) producing interim data from said raw data;
   (c) processing said interim data to identify and extract at least two selected features; and
   (d) obtaining said selected features to produce the digitized map database having a high resolution in matrix format, comprising a separate file for each selected feature.

2. The method as defined in claim 1, wherein step (a) comprises the step of obtaining said digitized raw data in the form of digitized intensity files of red, green and/or blue.

3. The method as defined in claim 1, wherein step (b) comprises the step of producing said interim data in the form of red, green, blue and/or black feature files.

4. The method as defined in claim 1, wherein step (c) comprises the step of identifying and extracting a vegetation feature as one of said at least two selected features.

5. The method as defined in claim 1, wherein step (c) comprises the step of identifying and extracting an hydrography feature as one of said at least two selected features.

6. The method as defined in claim 1, wherein step (c) comprises the step of identifying and extracting a lines of communication feature as one of said at least two selected features.

7. The method as defined in claim 1, wherein step (c) comprises the step of identifying and extracting a miscellaneous feature as one of said at least two selected features.

8. The method as defined in claim 1, wherein step (c) comprises the step of identifying and extracting a terrain elevation feature as one of said at least two selected features.

9. The method as defined in claim 3, wherein step (c) comprises the step of identifying the extracting, using said green feature file, a vegetation feature as one of said at least two selected features.

10. The method as defined in claim 3, wherein step (c) comprises the step of identifying and extracting, using said blue feature file, an hydrography feature as one of said at least two selected features.

11. The method as defined in claim 3, wherein step (c) comprises the step of identifying and extracting, using said black feature file, a lines of communication feature as one of said at least two selected features.

12. The method as defined in claim 3, wherein step (c) comprises the step of identifying and extracting, using said black feature file, a miscellaneous feature as one of said at least two selected features.

13. The method as defined in claim 3, wherein step (c) comprises the step of identifying and extracting, using said red feature file, a terrain elevation feature as one of said at least two selected features.

14. A method of generating in accordance with a map source a digitized map database in matrix format, comprising the steps of:
   (a) scanning the map source to obtain digitized intensity files of red, green and/or blue in matrix format;
   (b) producing feature files of red, green, blue and/or black from said digitized intensity files;
   (c) extracting vegetation features from said feature files to produce a vegetation file;
   (d) extracting hydrography features from said feature files to produce an hydrography file;
   (e) extracting lines of communication and miscellaneous features from said feature files to produce a lines of communication file and a miscellaneous features file;
   (f) extracting elevation features from said feature files to produce a terrain elevation file; and
   (g) storing said vegetation file, said hydrography file, said lines of communication file, said miscellaneous features file and said terrain elevation file, which comprise the digitized map database having a high resolution in matrix format.

15. The method as defined in claim 14,
   wherein step (c) comprises processing said green feature file to produce said vegetation file,
   wherein step (d) comprises processing said blue feature file to produce said hydrography file,
   wherein step (e) comprises processing said black feature file to produce said lines of communication file and said miscellaneous features file, and
   wherein step (f) comprises processing said red feature file to produce said terrain elevation file.

16. A method of generating a digitized map database, comprising the steps of:
   (a) scanning a map source having a plurality of map sections to obtain digitized intensity files of red, green and/or blue in matrix format for each of said map sections;
   (b) producing feature files of red, green, blue and/or black for each of said map sections from said intensity files;
   (c) processing said green feature file for each of said map sections to produce a vegetation file for each of said map sections;
   (d) processing said blue feature file for each of said map sections to produce an hydrography file having hydrography features for each of said map sections;
   (e) processing said black feature file for each of said map sections to produce a lines of communication file and a miscellaneous features file for each of said map sections;
   (f) processing said red feature file for each of said map sections to produce a terrain elevation file for each of said map sections; and
   (g) combining respectively said vegetation file, said hydrography file, said lines of communication file, said micellaneous features file and said terrain elevation file for each of said map sections to produce a vegetation file, an hydrography file, a lines of communication file, a miscellaneous features file and a terrain elevation file, which comprise said digitized map database with a high resolution in matrix format.

17. A method as defined in claim 14 or 16, wherein said step (c) comprises the steps of:
   (i) enhancing said green feature file by generating a density map, removing noise from said density map, and producing an enhanced green feature file from said density map with removed noise;
   (ii) condensing said enhanced green feature file to produce a condensed green feature file;
   (iii) generating a vegetation location list from said black feature file;
   (iv) condensing said vegetation location list to produce a condensed vegetation location list;

(v) creating an interim vegetation file by merging said condensed green feature file and said condensed vegetation location list; and (vi) filling in remaining vegetation from said black feature file, and adjusting contrast in said interim vegetation file to produce said vegetation file.

18. A method as defined in claims 14 or 16, wherein said step (d) comprises:

(i) enhancing said blue feature file by generating a density map, removing noise from said density map, and producing an enhanced blue feature file from said density map with removed noise;

(ii) identifying and tagging said hydrography features in said enhanced blue feature file to produce a tagged blue feature file;

(iii) thinning exaggerated features of said hydrography features in said tagged blue feature file to produce a thinned blue feature file; and (iv) condensing said thinned blue feature file to produce said hydrography file.

19. A method as defined in claim 14 or 16, wherein said step (d) comprises the step of separating said hydrography file to produce an hydrography presence file and an hydrography type file.

20. The method as defined in claims 14 or 16, wherein said step (e) comprises:

(i) enhancing said red feature file by generating a density map, removing noise from said density map, and producing an enhanced red feature file from said density map with removed noise;

(ii) condensing said enhanced red feature file to produce a condensed red feature file;

(iii) identifying and tagging certain preselected features in said condensed red feature file to produce a tagged red feature file;

(iv) identifying, tagging, extracting and storing specific features from said black feature file into an extracted features file;

(v) condensing said extracted features file to produce a condensed extracted features file;

(vi) producing a lines of communication and miscellaneous features file by merging said tagged red feature file and said condensed extracted features file; and (vii) separating said lines of communication and miscellaneous features file into said lines of communcation file and said miscellaneous features file.

21. The method as defined in claims 14 or 16, wherein step (f) comprises:

(i) extracting contour lines in said red feature file;

(ii) tagging said contour lines with elevation values to produce a tagged red feature file;

(iii) condensing said tagged red feature file to produce a condensed red feature file;

(iv) producing a predetermined number of rough elevation files by interpolating said elevation values of said condensed red feature file; and (v) producing said terrain elevation file by averaging said predetermined number of rough elevation files.

22. A system for generating a digitized map database comprising:

(a) means for scanning a map source to obtain digitized raw data in matrix format;

(b) means for producing interim data from said digitized raw data;

(c) means for processing said interim data to identify and extract at least two selected features; and (d) means for obtaining said selected features to produce the digitized map database having a high resolution in matrix format, comprising a separate file for each selected feature.

23. A system for generating a digitized map database, comprising:

(A) scanning means for obtaining from a map source having a required resolution digitized intensity files of red, green and/or blue in matrix format;

(B) processing means, connected to said scanning means, which comprises:

(i) first means for producing in matrix format feature files of red, green, blue and/or black from said digitized intensity files;

(ii) second means for extracting vegetation features from said feature files to produce a vegetation file in matrix format;

(iii) third means for extracting hydrography features from said feature files to produce an hydrography file in matrix format;

(iv) fourth means for extracting lines of communication and miscellaneous features from said feature files to produce a lines of communication and miscellaneous features file in matrix format; and (v) fifth means for extacting terrain elevation from said feature files to produce a terrain elevation file in matrix format; and (c) storing means, connected to said processing means, for storing said vegetation file, said hydrography file, said lines of communication and miscellaneous features file and said terrain elevation file in a storage means in matrix format to produce the digitized map database having said required resolution in matrix format.

24. The system as defined in claim 23, wherein said processing means includes a computer means under program control.

25. A system for generating a digitized map database, comprising:

(A) scanning means for obtaining from a map source having a plurality of map sections digitized intensity files of red, green and/or blue in matrix format for each of said map sections;

(B) processing means, connected to said scanning means, which comprises:

(i) first means for producing in matrix format from said digitized intensity files feature files of red, green, blue and/or black for each of said map sections;

(ii) second means for extractng vegetation features from said feature files to produce a vegetation file in matrix format for each of said map sections;

(iii) third means for extracting hydrography features from said feature files to produce as hydrography file in matrix format for each of said map sections;

(iv) fourth means for extracting lines of communication and miscellaneous features from said feature files to produce a lines of communication and miscellaneous features file in matrix format for each of said map sections;

(v) fifth means for extracting terrain elevation from said feature files to produce a terrain elevation file in matrix format for each of said map sections; and (vi) sixth means for combining respectively for each of said map sections said vegetation file, said hydrography file, said lines of communcation and miscellaneous features file, and said terrain elevation file to produce a vegetation file, an hydrography file, a lines of communication and miscellaneous features file and a terrain elevation file for the map source;

(C) storing means, connected to said processing means, for storing said vegetation file, said hydrography file, said lines of communication and miscellaneous features file and said terrain elevation file in a storage means to produce the digitized map database having a high resolution in matrix format.

26. The system as defined in claims 23 or 25, wherein said second means comprises:
(a) means for enhancing said green feature file by generating a density map, removing noise from said density map, and producing an enhanced green feature file from said density file with removed noise;
(b) means for condensing said enhanced green feature file to produce a condensed green feature file;
(c) means for generating a vegetation location list from said black feature file;
(d) means for condensing said vegetation location list to produce a condensed vegetation location list; and
(e) means for creating an interim vegetation file by merging said condensed green feature file and said condensed vegetation location list;
(f) means for filling in remaining vegetation from said black feature file and adjusting contrast in said interim vegetation file to produce said vegetation file.

27. The system as defined in claims 23 or 25, wherein said third means comprises:
(a) means for enhancing said blue feature file by generating a density map, removing noise from said density map, and producing an enhanced blue feature file from said density map without noise;
(b) means for identifying and tagging said hydrography features in said enhanced blue feature file to produce a tagged blue feature file;
(c) means for thinning exaggerated features of said hydrography features in said tagged blue feature file to produce a thinned blue feature file; and
(d) means for condensing said thinned blue feature file to produce said hydrography file.

28. The system as defined in claims 23 or 25, wherein said third means comprises:
means from separating said hydrography file into an hydrography presence file and an hydrography type file.

29. The system as defined in claims 23 or 25, wherein said fourth means comprises:
(a) means for enhancing said red feature file by generating a density map, removing noise from said density map, and producing an enhanced red feature file from said density map without noise;
(b) means for condensing said enhanced red feature file to produce a condensed red feature file;
(c) means for identifying and tagging certain preselected features in said condensed red feature file to produce a tagged red feature file;
(d) means for identifying, tagging, extracting and storing specific features from said black feature file into an extracted features file;
(e) means for condensing said extracted features file to produce a condensed extracted features file;
(f) means for producing a lines of communication and miscellaneous features file by merging said tagged red features file and said condensed extracted features file; and
(g) means for separating said lines of communications and miscellaneous features file into said lines of communication file and said miscellaneous features file.

30. The system as defined in claims 23 or 25, wherein said fifth means comprises:
(a) means for extracting contour lines in said red feature file;
(b) means for tagging said contour lines with elevation values to produce a tagged red feature file;
(c) means for condensing said tagged red feature file to produce a condensed red features file;
(d) means for producing a predetermined number of rough elevation files by interpolating said elevation values of said condensed red feature file; and
(e) means for producing said terrain elevation file by averaging said predetermined number of rough elevation files.

* * * * *